Nov. 20, 1928.  
G. L. BELLILE ET AL  
GAFF HOOK  
Filed Nov. 7, 1927  
1,692,325  
2 Sheets-Sheet 1
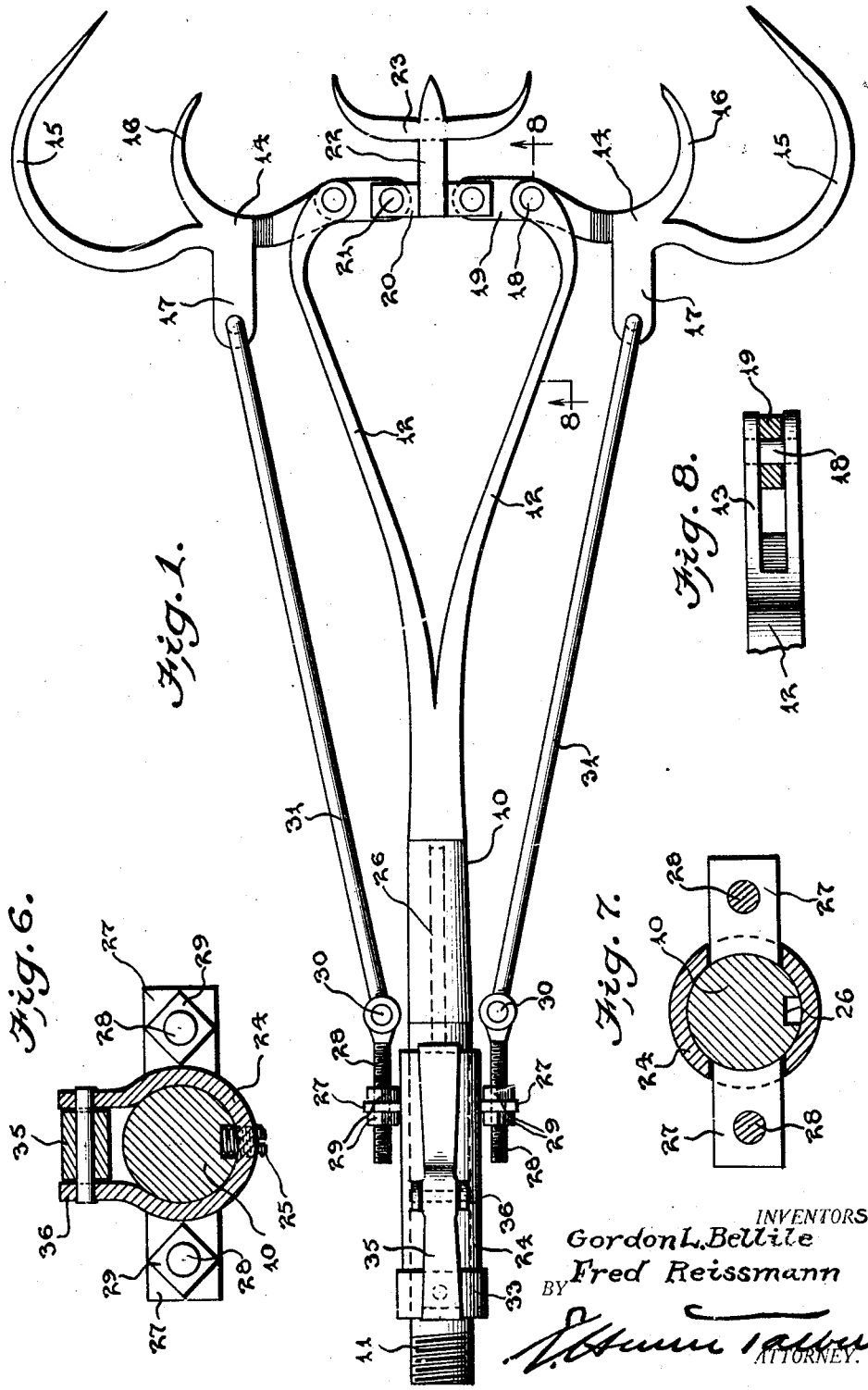
INVENTORS  
Gordon L. Bellile  
Fred Reissmann  
BY  
ATTORNEY.

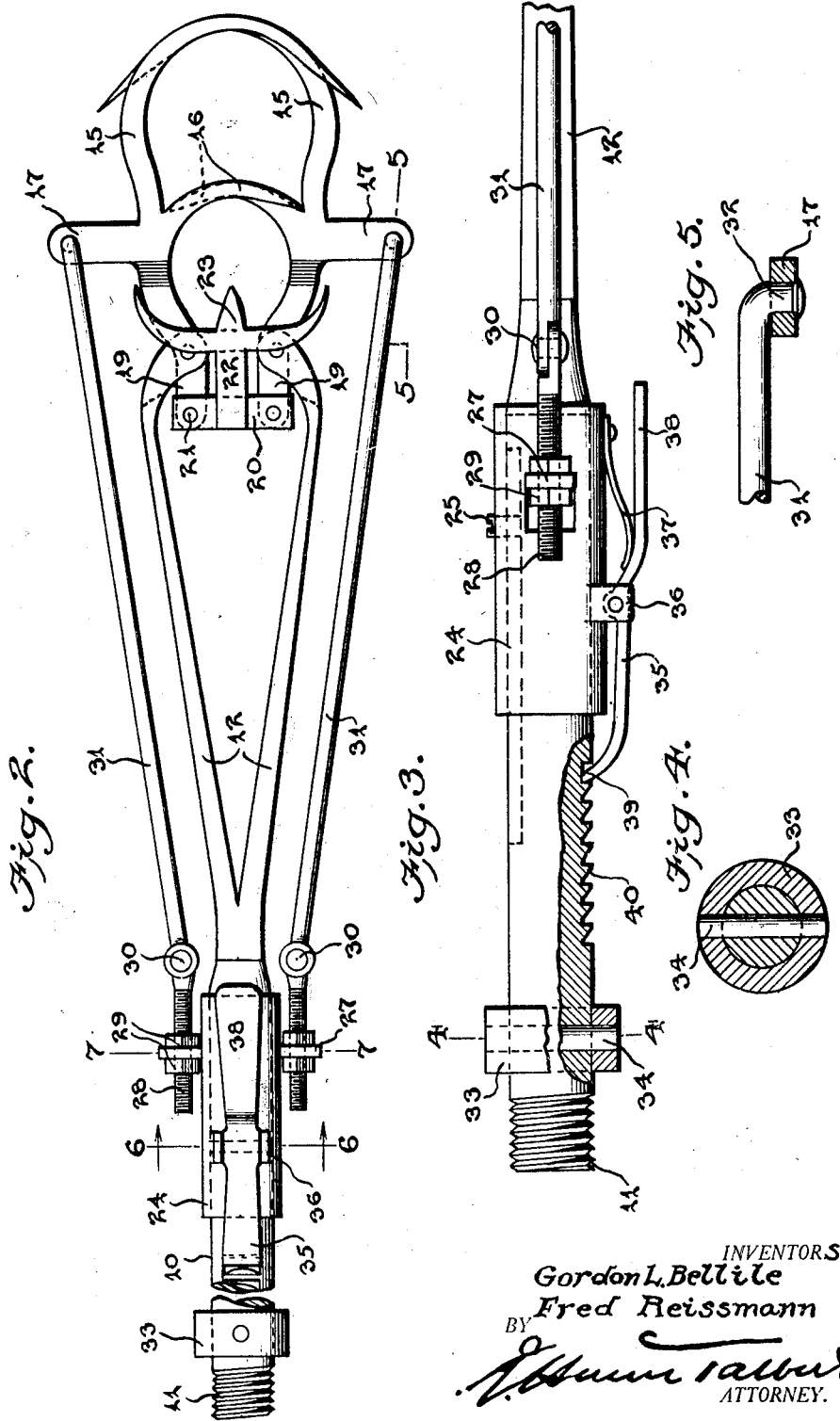

Patented Nov. 20, 1928.

UNITED STATES PATENT OFFICE.

GORDON L. BELLILE AND FRED REISSMANN, OF RHINELANDER, WISCONSIN.

GAFF HOOK.

Application filed November 7, 1927. Serial No. 231,558.

The object of the invention is to provide a gaff hook which, when set in open position, may be readily tripped when it becomes spring actuated to closed position; to provide such a hook with a positive lock precluding opening of the hook by any force applied to the hook members; and to provide a gaff hook which consists of relatively few parts and therefore susceptible of cheap manufacture and low marketing cost.

With this object in view, the invention consists in a construction and combination of parts of which a preferred embodiment is illustrated in the accompanying drawings, wherein:

Figure 1 is an elevational view illustrating the invention in open position.

Figure 2 is a view similar to Figure 1 but illustrating the closed position of the hook.

Figure 3 is an enlarged elevational view, partly broken away, illustrating a portion of the shank with the positive locking means for the hook.

Figure 4 is a transverse sectional view on the plane indicated by the line 4—4 of Figure 3.

Figures 5, 6 and 7 are respectively sectional views on the planes indicated by the lines 5—5, 6—6 and 7—7 of Figure 2.

Figure 8 is a sectional view on the plane indicated by the line 8—8 of Figure 1.

The shank 10 which at the rear or upper end is threaded at 11 for the attachment of an appropriate handle, is split at the forward end to provide divergent spring arms 12 having a normal spring tendency towards each other. The arms 12 have forked extremities 13 in which are pivotally mounted the hook members 14, the latter being formed with outer and inner hooks 15 and 16 and with arms 17 extending laterally from the hook members at the juncture of the outer and inner hooks 15 and 16. Pins 18 span the bifurcated extremities of the arms 12 and serve as the pivotal mountings for the hook members 14 which are formed with tail extensions 19 disposed on diametrically opposite sides of the pivot pins 18 from the hooks 15 and 16. The hook members carried by the two arms 12 are interconnected by means of the cross bar 20 with which the tail extensions have pivotal connections as indicated at 21, the cross bar 20 being arranged transversely of the shank 22 of a star-shaped trip spur 23.

A sleeve 24 is slidably mounted on the shank 10 but keyed against relative angular movement on the shank by means of a screw 25 which traverses the slot 26 in the shank. The sleeve is provided with lateral ears 27 on diametrically opposite sides through which extend eye bolts 28, the latter carrying nuts 29 abutting the ears on opposite sides and the eyes carrying pivot pins 30 constituting pivotal connections with links 31 which also have terminal pivotal connections 32 with the arms 17. Obviously movement of the sleeve along the shank will effect swinging movement of the hook members on the pivot pins 18 and by reason of the connection between the tail extensions of the two hook members with the cross bar 20, the spring arms 12 will be separated or swung away when the hook members are moved to open position. When the pivotal connections between the bar 20 and the tail extensions are aligned, the hooks will be retained in open position against the spring tendency of the arms 12 but may be tripped to swing to closed position by reason of the spring action of the arms 12 through the application of a slight pressure on the star-shaped trip spur 23.

Since the two hook members are operatively connected to the sleeve by means of the links 31 and since the latter have adjustable connections with the sleeve by reason of the threaded eye bolts and the nuts which secure them to the ears 27, the hook members may be adjusted to have the same relative positions on their respective arms so that in swinging to open position they have the same relative position to the shank 10 and the arms 12, thus assuring alignment of the pivotal connections 21 and 18 when the hooks are in open position.

A limiting stop for the sleeve is provided in the form of a collar 33 secured to the shank by means of a diametrical pin 34. Since the opening movement of the hooks effects movement of the sleeve rearwardly of the shank, the collar operates to arrest movement at a certain point and this is the position of the sleeve when the hooks are in the open position indicated in Figure 1 where they may be readily tripped to be impelled by the arms 12 to closed position. The collar thus serves in preventing the hooks being opened too far where the pivotal connections 21 would pass too far to one side of the pivotal connections 18 to prevent ready tripping. Accurate positioning of the collar 33 is unnecessary, since the adjustment of the eye bolts 28 may be made to insure the proper positioning of the hook members for tripping when the sleeve is against the collar.

The sleeve is permitted free movement of the staff in the direction of the spring arms 12 but is locked against reverse movement, so that when the hook members, having once been sprung, may not be opened by any pressure or force applied to the hook members themselves.

The locking means consists of a latch lever 35 pivotally mounted on the sleeve between ears 36 carried on the latter and having a flat spring 37 bearing against the under side of its handle portion 38. The nose 39 of the latch lever is, by means of the spring 37, forced into contact with the teeth 40 formed on the staff in a series running in the direction of the length of the latter. The teeth on one side are provided with faces disposed radially of the staff and on the other side with inclined faces, so that when the sleeve moves along the staff from the direction of the arms 12, the nose 39 may slide over the teeth but will engage the flat or radial faces of the teeth to preclude movement of the sleeve in the opposite direction. Thus when setting the hook to open position, the handle 38 is depressed to release the nose 39 from the teeth and the sleeve then slid rearwardly of the staff until it abuts the collar 33, when the hook members will be in the open position indicated in Figure 1 and ready for the performance of the spearing operation, such as the spearing of fish and the like. Immediately the victim contacts with the star-shaped spur 23 as when the staff is directed toward the victim, pressure tends to force the spur 23 backward and when the pivotal connections 21 have passed far enough to the left of the pivotal connections 18, as the structure is viewed in Figure 1, the spring arms function to force the two hook members together and grasp the victim between them, the sleeve the while sliding down the staff in the direction of the arms and the latch lever preventing recession of the sleeve by engagement with the teeth 40.

The invention having been described, what is claimed as new and useful is:

1. A gaff hook comprising a staff having terminal divergent spring arms, hook members having pivotal mountings in the terminals of said arms and tail extensions beyond said pivotal mountings, a trip spur having terminal pivotal connections with said tail extensions, a sleeve slidably mounted on the staff, and link connections between said sleeve and said hook members.

2. A gaff hook comprising a staff having terminal divergent spring arms, hook members having pivotal mountings in the terminals of said arms and tail extensions beyond said pivotal mountings, a trip spur having terminal pivotal connections with said tail extensions, a sleeve slidably mounted on the staff, and link connections between said sleeve and said hook members, the link connections with the sleeve being adjustable.

3. A gaff hook comprising a staff having terminal divergent spring arms, hook members having pivotal mountings in the terminals of said arms and tail extensions beyond said pivotal mountings, a trip spur having terminal pivotal connections with said tail extensions, a sleeve slidably mounted on the staff, and link connections between said sleeve and said hook members, the link connections with the sleeve being adjustable, and the staff being provided with an abutment collar to preclude movement of the sleeve in one direction.

4. A gaff hook comprising a staff having terminal divergent spring arms, hook members having pivotal mountings in the terminals of said arms and tail extensions beyond said pivotal mountings, a trip spur having terminal pivotal connections with said tail extensions, a sleeve slidably mounted on the staff, link connections between said sleeve and said hook members, and locking means for the sleeve to preclude movement on the staff in the direction in which it is moved by the opening movement of the hook members.

5. A gaff hook comprising a staff having terminal divergent spring arms, hook members having pivotal mountings in the terminals of said arms and tail extensions beyond said pivotal mountings, a trip spur having terminal pivotal connections with said tail extensions, a sleeve slidably mounted on the staff, link connections between said sleeve and said hook members, and locking means for the sleeve to preclude movement on the staff in the direction in which it is moved by the opening movement of the hook members, the staff being provided with a series of teeth arranged longitudinally of the staff and the sleeve having a spring actuated latch lever engageable with said teeth.

In testimony whereof they affix their signatures.

GORDON L. BELLILE.
FRED REISSMANN.